US007792787B2

(12) United States Patent
Sincaglia et al.

(10) Patent No.: US 7,792,787 B2
(45) Date of Patent: Sep. 7, 2010

(54) SYSTEM FOR DISTRIBUTED MEDIA NETWORK AND META DATA SERVER

(75) Inventors: Nicolas William Sincaglia, Sunnyvale, CA (US); Sylvain Pierre Rebaud, San Francisco, CA (US); James Patrick Lester, San Francisco, CA (US); Eric Wayne Hansen, San Jose, CA (US); David G. Lampton, San Francisco, CA (US); Timothy R. Bratton, Los Altos, CA (US)

(73) Assignee: RealNetworks, Inc., Seattle, WA (US)

( * ) Notice: Subject to any disclaimer, the term of this patent is extended or adjusted under 35 U.S.C. 154(b) by 355 days.

(21) Appl. No.: 11/751,453

(22) Filed: May 21, 2007

(65) Prior Publication Data

US 2007/0300222 A1  Dec. 27, 2007

Related U.S. Application Data

(62) Division of application No. 09/777,500, filed on Feb. 5, 2001, now abandoned.

(60) Provisional application No. 60/180,248, filed on Feb. 4, 2000.

(51) Int. Cl.
*G06F 17/00* (2006.01)

(52) U.S. Cl. .................. 707/607; 707/609; 707/690; 707/736; 707/791; 707/827

(58) Field of Classification Search .......... 707/600–831
See application file for complete search history.

(56) References Cited

U.S. PATENT DOCUMENTS 6,263,371 B1 * 7/2001 Geagan et al. ............. 709/231

7,149,359 B1 * 12/2006 Omoigui ..................... 382/219

FOREIGN PATENT DOCUMENTS

JP       11-306065       11/1995

* cited by examiner

*Primary Examiner*—Isaac M Woo
(74) *Attorney, Agent, or Firm*—AEON Law; Adam L. K. Philipp (57) ABSTRACT

A system and method of operation for a distributed media network and meta data server provides a low cost, efficient, reliable and versatile alternative to traditional media network systems. Multiple media data file servers are designated as primary or alternate data file servers for different media data media files. Related or linked media data files may be distributed throughout a media network which results in lower peak bandwidth usage at each media data file server. Each server in the distributed media network responds more quickly and efficiently due to its limited functionality and scope of media data files that it must server. Media data file servers transfer low bandwidth meta data to client devices allowing a significant increase in the number of clients which can simultaneously log in to a dedicated network server. The distributed system also provides media data owners with greater control over the media data files that they own by allowing the owners to encode, post or remove files from servers that they control and maintain. The alternate media data file servers of the distributed media network also can act as primary file servers during catastrophic errors of the primary media data file servers, thus resulting in a more reliable and fault tolerant media network.

8 Claims, 13 Drawing Sheets

SYSTEM FOR DISTRIBUTED MEDIA NETWORK AND META DATA SERVER

RELATED REFERENCES

This application is a divisional application of U.S. patent application Ser. No. 09/777,500, filed on Feb. 5, 2001, which is a non-provisional application of U.S. provisional application No. 60/180,248, filed on Feb. 4, 2000, and claims priority to said provisional application, the entireties of which are hereby incorporated by reference.

FIELD

This invention relates to network media systems, specifically to network systems for the delivery of information or entertainment data.

BACKGROUND

Devices connected to a network commonly are used to access media data over that network. Servers and databases are required to handle all requests by a networked media device and deliver the requested media data. Media systems that deliver media data to a media device over a computer network typically consist of a client device, a server and a database. Client devices log in to the network server. A client application requests data from the server. The server communicates with the database and requests that the database retrieve the specific data file. The data file is retrieved by the database and sent to the server. The server transfers the media data to the client over the network.

Media data such as audio, video and animated graphic data are typically large data files. Transmission of such data to a client device in a timely manner requires a significant amount of server bandwidth. Network bandwidth costs can be a significant percentage of the total costs of running and maintaining a media network server. Continuous programming of media data or sequential multimedia presentations may require multiple requests for additional media data. In addition, multiple devices accessing the network media server at the same time also contribute to additional server bandwidth requirements. Each request for media data increases the server bandwidth requirements and an increase in server workload. Media network servers handle all communications between the multiple clients and the database as well as sending the media data over the network. If demand for large media data files consumes the majority of the total server bandwidth, it limits the communication between the server and clients, which prevents additional clients from logging on to the network server.

Operators of such networked media data systems must design the media network system to meet the needs of peak bandwidth requirements to insure that requests made by client applications or devices are serviced and delivered in a timely manner without excessive delay times. System operators must purchase the network bandwidth required to service their media network's peak usage. Media systems that are accessed by a large amount of simultaneous clients can require enormous amounts of bandwidth for only a short period of time. Peak network usage may be, in fact, only a small percentage of the total average bandwidth used. Thus, operating costs of such a system can be very high for even a moderately frequented media network.

The operator of a media network system many times does not own the media data that is sent over the media network. Media data owners frequently license the media data to the network operators for limited use of the media data to help promote the sales of the media itself or associated products and services. Media data owners typically have the raw media in a format that is not optimized for network delivery. The media data must be sent to the network operators, digitized and encoded in media formats optimized for network delivery. The data next must be categorized and stored in the database. System operators incur significant time and costs for the categorization and storage of the media data. As mentioned, media data such as audio, video and animated graphics data can be very large. Storage costs of such data are expensive and time consuming.

The prior art media network systems present disadvantages for the media data owners. For example, once the media data has been input to the media network system, the media data owners no longer have direct control of the media data that they own. The operators of the media network control all day-to-day use of the media data. The addition or deletion of media data files to and from the network is much more difficult for the media data owners to control because they do not control or operate the media network.

Network operators also are presented with disadvantages of the above described prior art systems. When the media data that is being sent over the network has low sales, the operator of the network assumes the majority of the losses due to the bandwidth, storage and operation costs. The media data owners do not carry the burden of the overhead costs of the operation of the network, and therefore they can attempt to sell poor quality media products causing significant losses to the operators of the media network.

Finally, networked systems are susceptible to varying degrees of failure. Natural disasters, hardware and software failures all can affect the performance of a media network system. Technical difficulties that occur within the media system can affect the systems network connection, the retrieval of media data files, and may require the entire server to be reinitialized. Systems, which are contained at a single location, may have redundancy designed into the local system. However, catastrophic errors that affect the performance of an entire network area need to require additional network wide redundancy to increase network reliability.

SUMMARY OF THE INVENTION

In accordance with the present invention a distributed media network system comprises a centralized meta data server accessible by client devices, and a multiplicity of distributed media data file servers that present several objects and advantages over the prior art.

It is a advantage of the present invention to provide lower peak bandwidth requirements for each media data file server by distributing the media data files over a limitless number of media data file servers connected to a computer network.

It is another advantage to provide a reduced workload of each server by limiting its functionality and server tasks and responsibilities.

Another advantage of the preset invention is to provide a reduced workload to each media data file server by limiting the total number of media data files it is required store and serve.

Yet another advantage is to provide an increase in the total number of clients able to connect and log in to a network with a low bandwidth, dedicated network communication and meta data server.

It is yet another advantage to provide greater control over the use of the media data files by the media data owners by allowing the media data owners to operate and maintain their own media data file servers.

Still another advantage of the present invention is to provide greater speed and ease for media data owners to input their media data into the media network system.

It is still another advantage to provide a more cost effective and efficient media network due to distributed control and management of a distributed media network.

The present invention also provides an advantage of protection against network wide failures by distributing redundant media data files on both primary and alternate media data file servers throughout the distributed media network system.

Further objects and advantages of the present invention will be evident in the ensuing description and figures.

In an exemplary embodiment, a system for distributed media network and meta data server includes at least one client device connected via a network to a meta data server. The meta data server retrieves data from a meta data database which stores a list of all media data files and their sequential order which make up a client selected program. The meta data database may also be a file management system on a computer, or any other compatible device that stores information about media data files, such as where the files are located, the file types, and the file sizes, etc. The client device receives a plurality of meta data from the meta data server including network addresses for primary and alternate servers, directory structures for primary and alternate storage devices, names of media data files, and other information associated with each media data file.

In an exemplary embodiment, each client device is networked to a plurality of primary media data file servers and alternate media data file servers via request and feedback network communication connections. Each data file server is associated with its own media data storage device. The multiple media data file servers are designated as primary data file servers for different media data files. Media data file servers include, but are not limited to, HyperText Transmission Protocol ("http") file servers, File Transmission Protocol ("ftp") servers, streaming media servers and multicast streaming media servers. Upon request, client devices also may act as media data file servers. Likewise, a media data server also may be a client device. The term media data as referred to herein may include audio, video, text, speech, Musical Instrument Digital Interface ("MIDI"), SMTPE, graphic, animations and other media data as potential types of media data that can be scheduled for retrieval, storage and access by an end user. Communication between a client device and the meta data server or media data file servers can be realized in hardware, software or firmware implementations. Potential client devices of an exemplary embodiment include computers, set top media devices, hand held devices, portable media devices, mobile media devices, wireless devices, satellite signal receivers and transmitting devices, short wave and common band radio devices, and any other devices capable of connection to a communication network.

Meta data servers of the exemplary embodiment transfer low bandwidth meta data to client devices and require lower peak bandwidths due to a distributed nature of the media network. Low bandwidth requirements of the meta data information allow a significant increase in the number of clients which can simultaneously log in to the dedicated meta data server. The media programs, which are a collection of related or linked media data files, can be distributed throughout the media network and result in lower peak bandwidth usage at each media data file server. Thus, each server in the distributed media network can respond more quickly and efficiently due to its limited functionality and scope of media data files it must server. Unlike traditional media servers which handle both communications with client devices and database, the distributed media network limits file transfers to the media data file servers and communications to the meta data servers. In addition, media data file servers only serve a percentage of total number of media data files in the media network. Smaller file storage requirements result in faster access times and reduced storage costs.

The owners of the media network operate and maintain the client device, the meta data server and meta data database servers. However, the distributed media network of the exemplary embodiment provides media data owners with greater control over the media data files they own. Media data owners can digitize, encode and post or remove their files on servers that they control and maintain. Media data owners also benefit from the speed and ease in which they can have their media files input to the system. Media data owners register all media files that they want available to client devices with the operators of the meta data servers. Once the required meta data information is obtained and stored in the meta data database and the files are posted on the media data file servers, the file will be available for access by the client devices.

In the exemplary embodiment of the present invention, the media data file servers can act as alternate file servers in case catastrophic errors occur to the primary media data file servers. This configuration results in a much more reliable and fault tolerant media network. The media network is less susceptible to regional catastrophic events than traditional media network systems. Alternate media data file servers may be designed more inexpensively with respect to the primary media data file servers because they are used only as a back up. Thus, alternate media data file servers require reduced peak bandwidth requirements due to their limited and rare use in the system. A single alternate media data file server may store the files of several primary media data file servers. Due to the alternate media data files server's limited use, slower access times to transfer the media data files are less of a concern.

The distributed media network and meta data server of the exemplary embodiment of the present invention provides a low cost, efficient, reliable and versatile alternative to traditional media network systems. Shared control and shared costs of the distributed media network enable a low cost, efficient and highly reliable media network to both the media data file owners as well as the media network operators.

In an exemplary method of the use of the distributed media network, any connection to a network, e.g. land line, wireless or satellite transmissions, and other suitable connections that enable transfer of data from the network to the client device may be utilized. In a first exemplary method, a client device logs into a meta data server of the distributed media network. The meta data server and meta data database verify the client. Once verified and logged in, the client device may send a request for a media program to the meta data server. The meta data server utilizes a file lookup to determine the meta data for the media data of the program selected by the client device. The meta data server communicates the request meta data back to the client device. The client device utilizes the meta data to request media files from the primary media data file servers identified by the meta data. Once the primary media data file server receives the request, the primary media data file storage searches for the requested media file data. If the file is found, the primary media data file server transmits the data to the client for processing. The client may then request more media data files.

If the media data files are not found in the primary media data file storage, then a "not found" message is sent to the client device. The client device then determines whether the meta data includes the network addresses for alternate media data file storage that contains the requested media data. If an alternate media data file storage does not exist, then the client must request another media data file from the meta data server. If the meta data includes an alternate media data file storage address, then the client device requests the media data from the alternate media data file server. The media data file server processes the request and messages the alternate media data file storage to search for the requested media data. If the requested file is not found, and no alternate media data file storage addresses are contained in the meta data, the client device must initiate another request for media data. If the requested media data is found in the alternate media data file storage, the data is transmitted to the client device via the alternate media data file server. The client device then processes the media data file and may then request additional meta data from the meta data server.

The exemplary embodiment of the present invention also provides means for securing the media data files to protect the copyright holders and/or owners of the media data files from illegal copying. The files of a media data program may be stored in various media data file storage locations throughout the media network, or may be partial media data files, encrypted media data files or any combination thereof. In a method utilizing secured partial or encrypted media data files, the client device requires additional data to reconstruct the media data file and/or to unlock the encryption algorithm. The meta data server may be used to transfer this additional data to the client device once the client has been verified. In the method for secure media data files, once the requested media data file is found by a primary or alternate data file server, the client device must request additional media data if the received data is a partial file, and/or must request an encryption key from the meta server. Requests from the client device and the subsequent search for files at one of the primary or alternate media data file servers may involve several iterations to construct the full media data program in the secure distributed network system of the exemplary embodiment.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION

Figure 1:
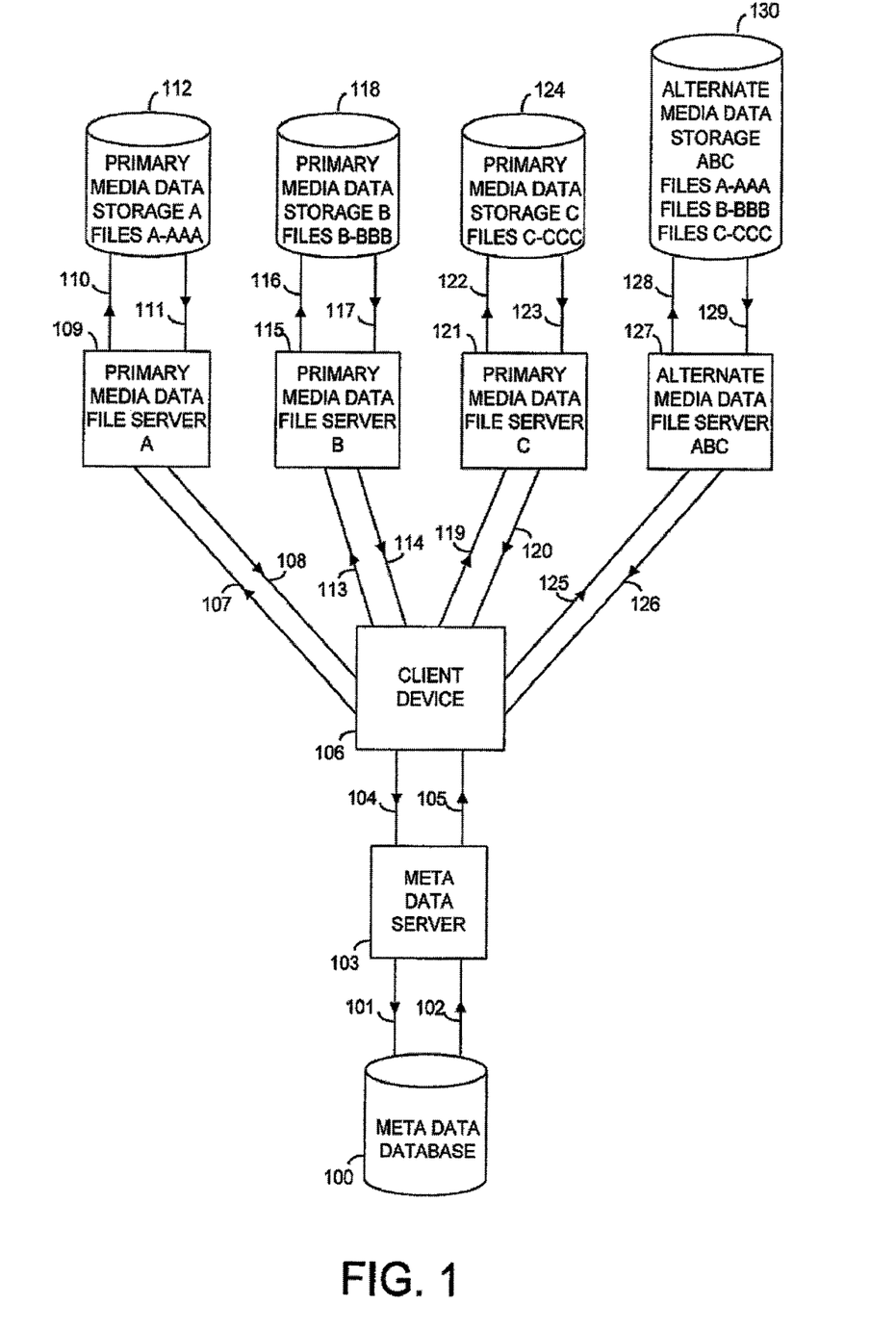
FIG. 1 is a block diagram of a client device, a meta data server and distributed media data file servers and all communications between each element.

FIG. 1 illustrates a preferred embodiment of a system of the present invention. A client device 106 is connected to a meta data server 103, a primary media data file server A 109, a primary media data file server B 115, a primary media data file server C 121, and an alternate media data file server ABC 127. In other embodiments of the present invention, additional alternate and primary media data file servers are connected to the client device via a network communication. The client device 106 messages to a meta data server 103 over a computer network via a meta data server request 104, and receives messages from the meta data server 103 over a computer network via a meta data server feedback 105. The meta data server 103 queries a meta data database 100 via a meta data database request 101, and receives query results from the meta data database 100 via a meta data database feedback 102.

The client device 106 of the preferred embodiment is connected over a computer network to primary media data file servers 109, 115, 121 and an alternate media data file server 127. Each connection includes a request connection 107, 113, 119, 125, and a feedback connection 108, 114, 120, 126. Specifically, the client device 106 messages a primary media data file server A 109 via a client device server A request 107 and receives communications and media data files from the primary media data file server A 109 via a client device server A feedback 108. Similarly, the client device 106 messages the primary media data file server B 115 via a client device server B request 113, which sends return communications and media data files to the client device 106 via a client device server B feedback 114. Primary media data file server C 121 and alternate media data file server ABC 127 likewise receive requests from the client device 106 utilizing a client device server C request 119 network connection and a client device alternate server ABC request 125 network connection, respectively. Primary media data file server C 121 and alternate media data file server ABC 127 return communications and media data files to the client device 106 via a client device server C feedback 120 network connection and a client device alternate server ABC feedback 126 network connection.

The primary media data file server A 109 requests media data files from a primary media data storage A files A-AAA 112 via a primary media data file server A request 110. In response, the primary media data storage A files A-AAA 112 messages back to the primary media data file server A 109 via a primary media data file server A feedback 111. Likewise, the primary media data file server B 115 requests media data files from a primary media data storage B files B-BBB 118 via a primary media data file server B request 116 network connection, and receives data from the primary media data storage B files B-BBB 118 via a primary media data file server B feedback 117. The primary media data file server C 121 requests media data files from a primary media data storage C files C-CCC 124 via a primary media data file server C request 122. The primary media data storage C files C-CCC 124 messages back to the primary media data file server C 121 via a primary media data file server C Feedback 123. Communications and data exchanges between the alternate media data file server ABC 127 and the alternate media data storage ABC files A-AAA, B-BBB and C-CCC 130 is realized over an alternate media data file server ABC request 128 network connection and an alternate media data file server ABC feedback 129 network connection.

Figure 2A:
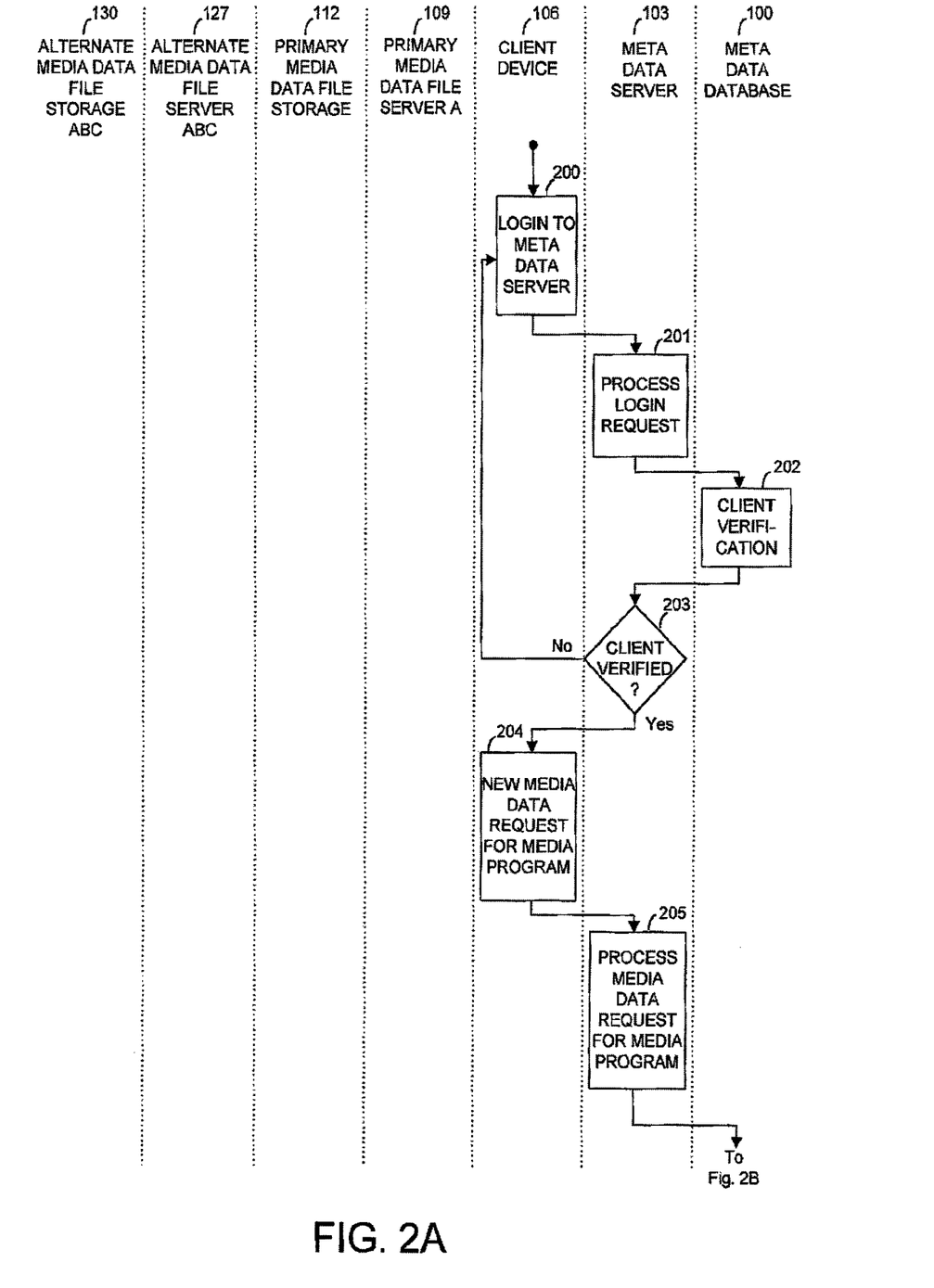
FIGS. 2A to 2E is a system operation and communication flow diagram of a preferred embodiment of the present invention.

FIGS. 2A-2E illustrate a system operation and communication flow diagram of a preferred embodiment of the system illustrated in FIG. 1. Referring to FIG. 2A, the client device 106 first is required to login 200 to the meta data server 103 before it is allowed access to the information and data available on the media network. The client device 106 messages a login sequence 200 to the meta data server 103 to verify the client device's 106 authentication. The meta data server 103 processes the login request 201 by querying the meta data database 100 which verifies that the login sequence of the client device 106 matches with an entry stored in memory.

The meta data database 100 messages back to the meta data server 103, via the meta data database feedback 102 as shown in FIG. 1, if the login sequence is matched 202. The meta data server 103 returns a true or false authorization 203 to the client device 103 via the meta data server feedback 105. If the meta data server 103 has denied authorization 203, the client device 106 may try again to login to the meta data server 103 or cease operation. If the client device 106 has been authorized 203 to login to the meta data server 103, a return message is sent to the client device 106. The client device 106 then can request new media data 204 from the meta data server 103 for the media program schedules by the client device 103. The meta data server 103 then processes the media data request for the media program 205, and messages to the meta data database 100 via the meta data database request 101.

Figure 2B:
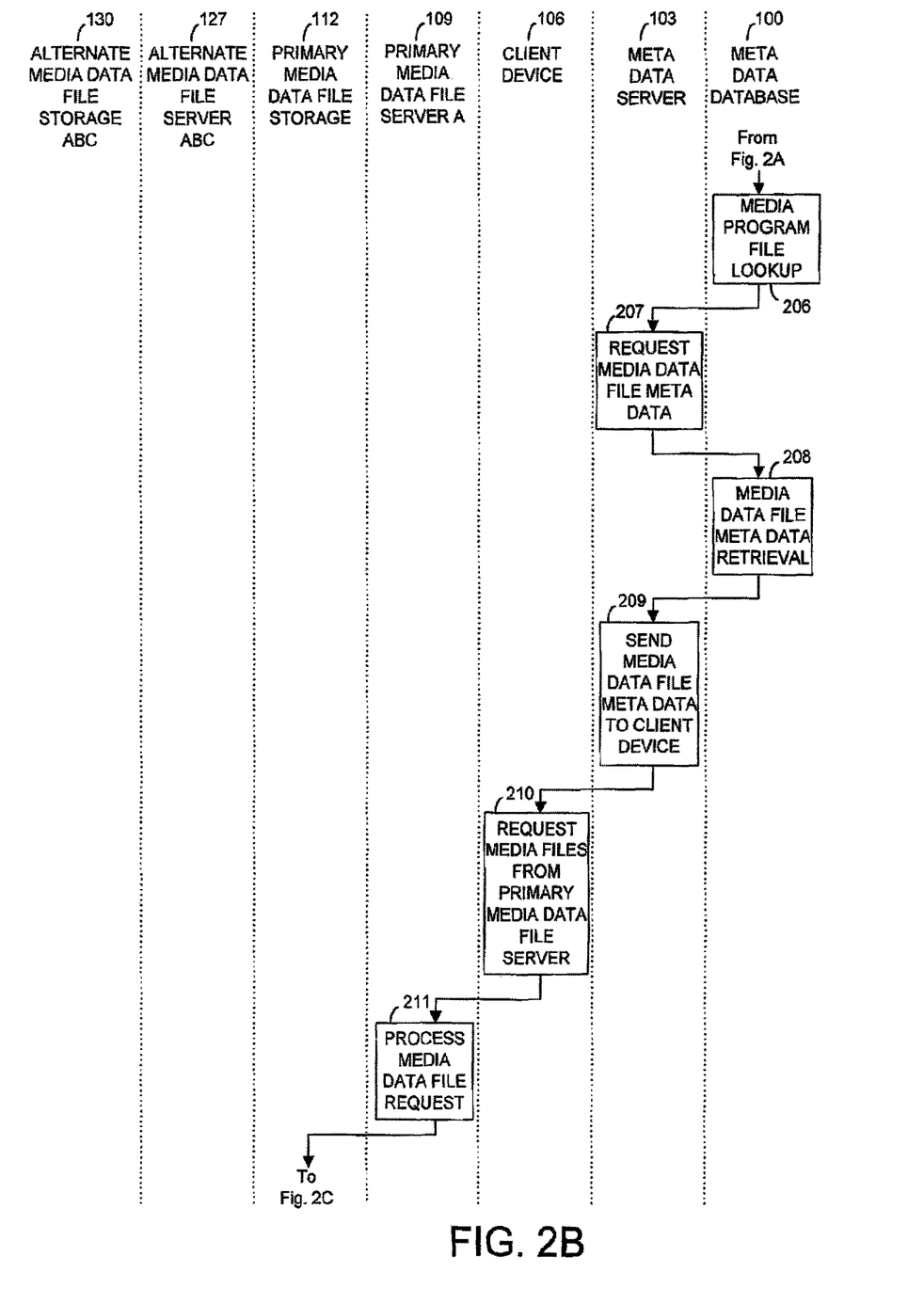

Referring to FIG. 2B, the meta data database 100 stores a list of all media data files and their sequential order which make up the client selected program. The meta data database 100 utilizes stored data of previous requests and transactions made by the particular client device 103 to determine 206 which media data file is next on the program list. The result of the media program file lookup 206 is sent to the meta data server 103, which then requests 207 the meta data database 100 to retrieve all associated meta data for that media data file 208. Meta data for a particular media data file includes, but is not limited to, the following information:

(1) A network address of a primary server 109, 115, 121 that has access to the media data file;
(2) Directory structure of a primary storage device 112, 118, 124 that contains the media data file;
(3) The name of the media data file;
(4) A network address of all alternate servers 127 that have access to the media data file;
(5) Directory structure of all alternate storage devices 130 that contain the media data file;
(6) The name of an owner of the media data file;
(7) The name of a composer of the media data file;
(8) The name of a copyright holder of the media data file;
(9) The network address of a primary or alternate server 109, 115, 121, 127 that has access to a graphical image associated with the media data file;
(10) Directory structure of the primary or alternate storage device 112, 118, 124, 130 that contains a graphical image associated the media data file;
(11) The name of the graphical image file associated media data file;
(12) The title of the artistic work contained in the media data file;
(13) The title of the body of work in which the media data file is associated;
(14) Performers of the media data file;
(15) Composers of artistic work contained on the media data file;
(16) Creators of the media data file;
(17) A network address of a primary or alternate server 109, 115, 121, 127 that has access to additional information about artistic work contain in the media data file;
(18) Directory structure of a primary or alternate storage device 112, 118, 124, 130 that contains the additional information about the work contained in the media data file;
(19) The name of the file that contains the additional information about the artistic work contained in the media data file;
(20) A network address of a primary or alternate server 109, 115, 121, 127 which offers the sale of the media data file;
(21) Directory structure of a primary or alternate storage device 112, 118, 124, 130 that contains the sales information for the media data file;
(22) The name of the file that contains the information on the sale of the media data file;
(23) A network address of a primary or alternate server 109, 115, 121, 127 which offers the sale of associated products of the media data file;
(24) Directory structure of a primary or alternate storage device 112, 118, 124, 130 that contains the sales information for the associated products of the media data file; and
(25) The name of the file that contains the information on the sale of associated products of the media data file.

Continuing with FIG. 2B, the Meta Data Server 103 does not transmit actual media files to the Client Device 106. Only the meta data associated with a particular media file is handled by the meta data server 103. All meta data for the selected media data file is retrieved 208 from memory by the meta data database 100 and sent to the meta data server 103 via the meta data database feedback 102, as shown in FIG. 1. In block 209, the meta data server 103 messages all of the meta data information the client device 106 via the meta data server feedback 105. The client device 106 messages one of the primary media data file servers 109, 115, 121, as shown in block 210, using the network address of the primary server 109, 115, 121, directory structure of the primary storage device 112, 118, 124 and the file name of the media data file. For purposes of clarity in this description of operation, primary media data file server A 109 is selected to be the primary media data file server for the selected media data file. As shown in block 211 of FIG. 2B, media data file server A 109 queries the media data file storage A 112 via the media data file request 110 for the media data file.

Figure 2C:
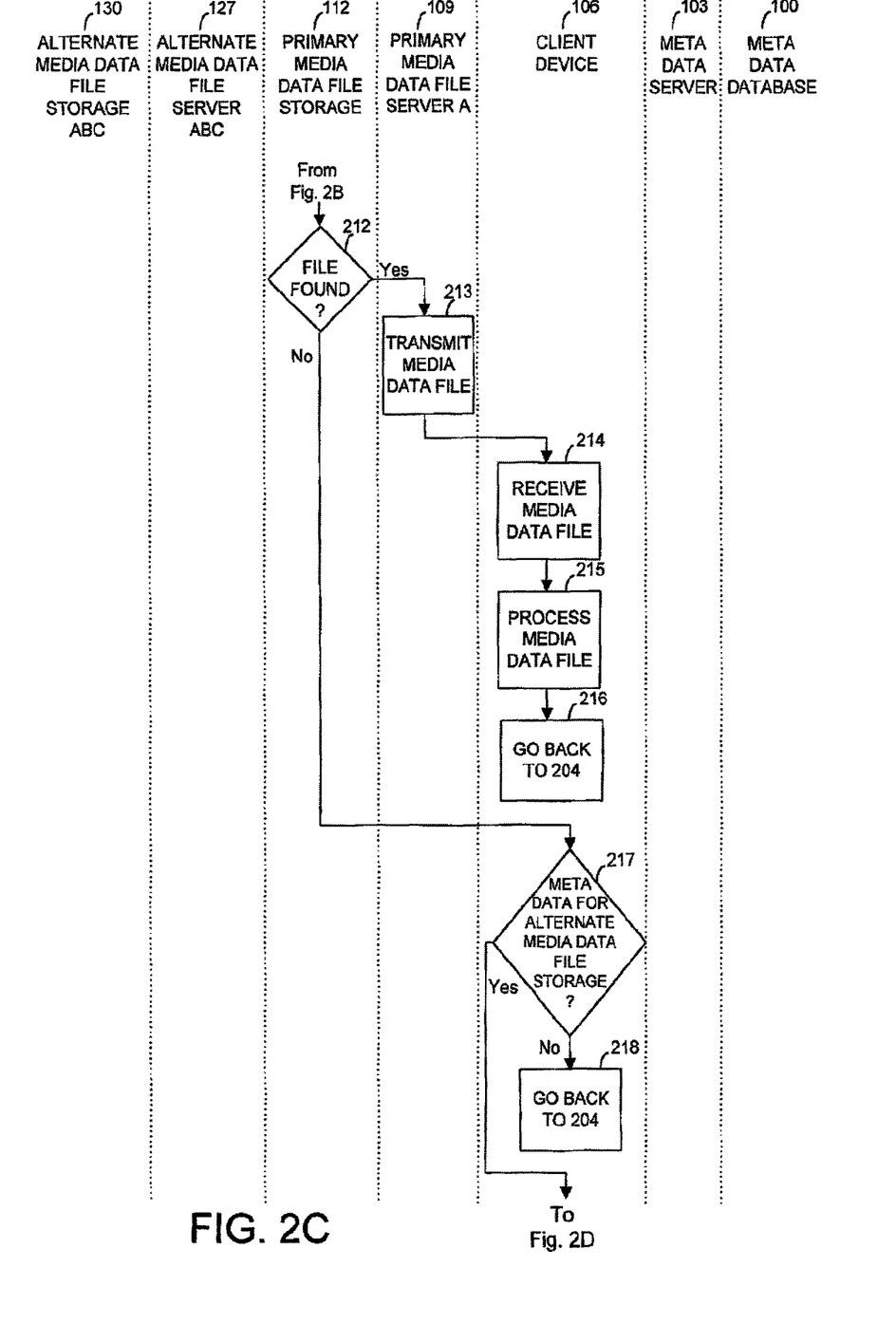

Referring to block 212 of FIG. 2C, if the requested media data file is stored in primary media data storage A files 112, the requested media file is transferred via the primary media data file server A feedback 111 to the primary media data file server A 109. The primary media data file server A 109 next transfers 213 the media data file to the client device 106 via the client device server A feedback 108. The client device receives the media data file 214, processes the media data file 215, and, as shown in block 216, returns to block 204 to request new media data for a media program.

Referring back to block 212, if the media data file is not located in the primary media data file storage A 112, or if media data file server A 109 is operating defectively for any reason, the media data file will be unable to transfer to the Client Device 106. Upon receiving an error message from the primary media data file server A 109, or upon not being able to establish communication with the primary media data file server A 109, the client device 106 checks whether the media data file is accessible by an alternate media data file server 217. For the purposes of clarity in this description of operation, alternate media data file server ABC 127 is selected to be the alternate media data file server for the selected media data file. Continuing to block 218, if the client device 106 does not have meta data for an alternate media data storage 130, operation returns to block 204 to request new media data for a media program.

Figure 2D:
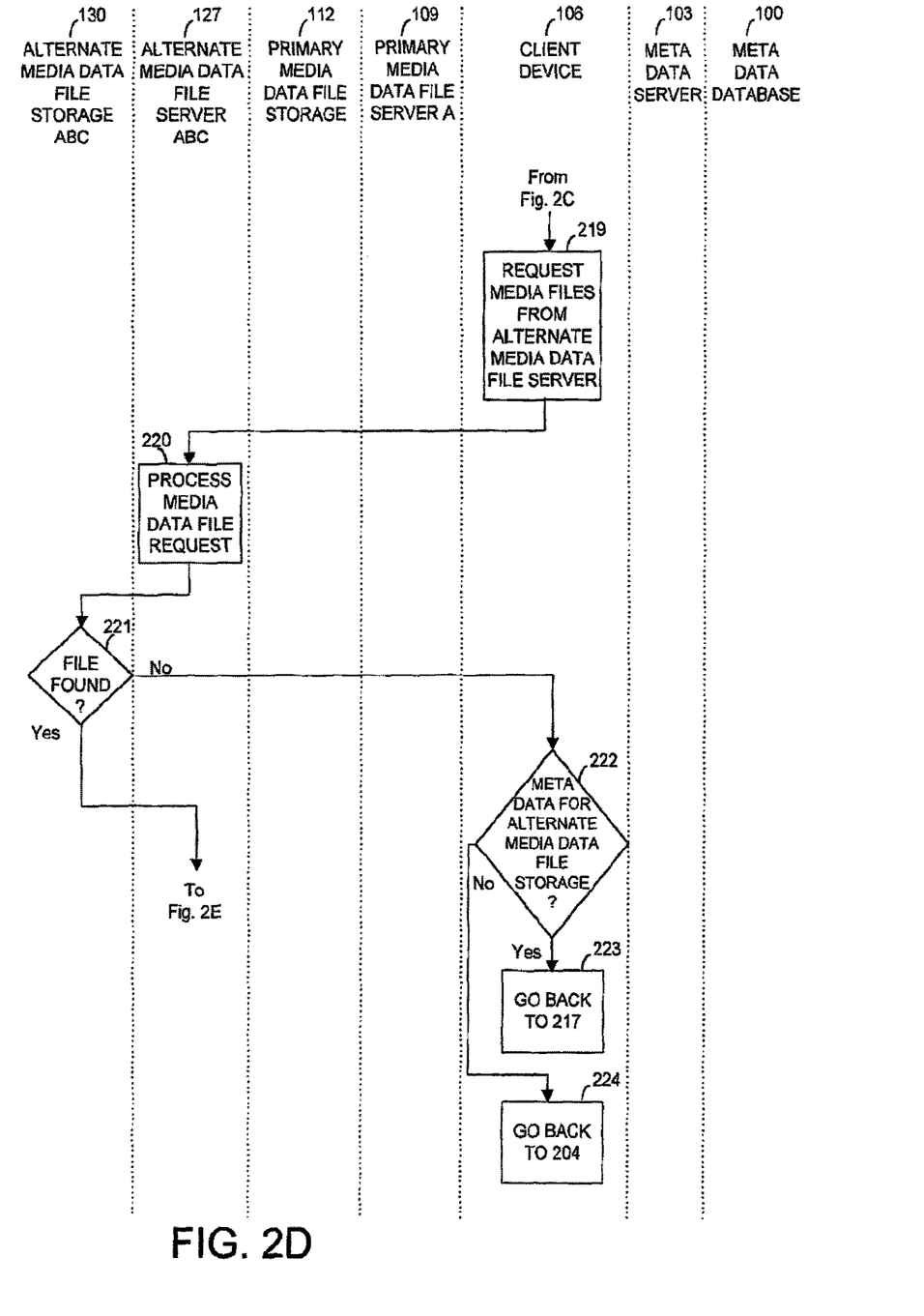
Figure 2E:
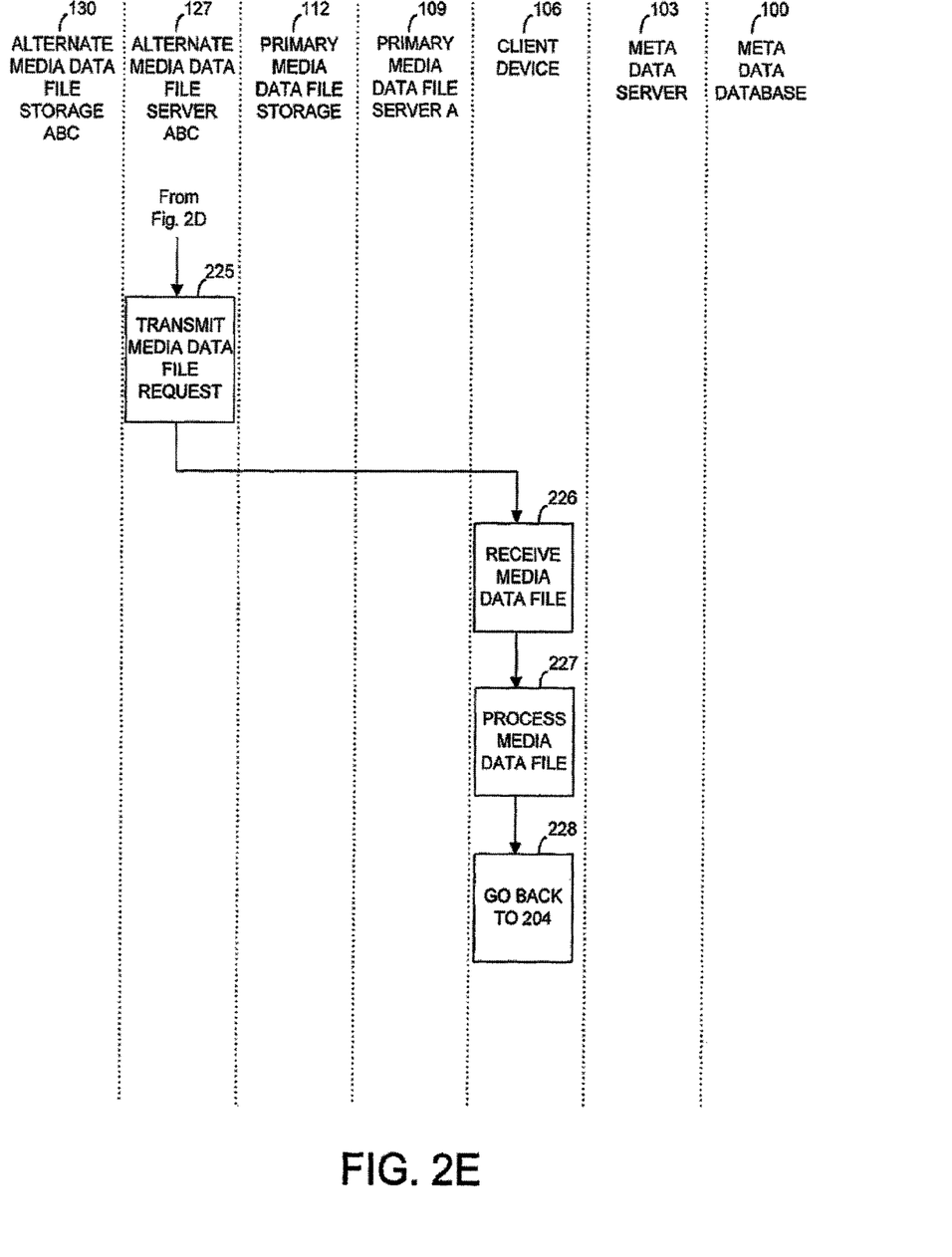

As shown in block 219 of FIG. 2D, if the client device 106 has meta data for an alternate media data storage 130, then the client device 106 messages the alternate media data file server ABC 127 using the network address of the alternate media data file server ABC 127, the directory structure of the alternate media data storage ABC 130, and the file name of the media data file via the client device alternate server ABC request 125 network connection. The alternate media data file server ABC 127 processes the media data file request 220 and queries the alternate media data file storage ABC 130 for the media data file via the alternate media data file server ABC request 128. If the media data file is stored in memory 221 in the alternate media data file storage ABC 130, the file is transferred, via the alternate media data file storage ABC feedback 129, to the alternate media data file server ABC 127, as shown in block 225 of FIG. 2E. The alternate media data file server ABC 127 next transfers the media data file to the client device 106 via the client device alternate sever ABC Feedback 126. The client device 106 receives the media data file 226, processes the media data file 227, and as shown in block 228, returns to block 204 to request new media data for a media program.

Referring back to block 221 of FIG. 2D, if the media data file is not located in the alternate media data file storage ABC 130, or if the alternate media data file server ABC 130 is operating defectively for any reason, the media data file will be unable to transfer to the Client Device 106. Upon receiving an error message from the alternate media data file server ABC 127, or upon not being able to establish communication with the alternate media data file server ABC 127, the client device 106 determines whether the media data file is accessible by another alternate media data file server as shown in block 222. The client device 106 continues to try alternate media data file servers, block 224, until it succeeds in retrieving the media data file or until it has tried all media data file servers but has been unsuccessful at locating the media data file. If the client device is unsuccessful, block 224, it will message the meta data server 103 of the error and request the next media data file for the selected program via the meta data server request 104.

FIGS. 3A-3G illustrates the system operation and communication flow diagram of an alternative embodiment of the present invention. Copyright holders and/or owners of the media data files may require that security measures be taken to insure that the intellectual property contained in the media data files distributed throughout the media network are protected and are not easily stolen or copied illegally. Files stored in memory on the various media data file storage locations throughout the media network may instead be partial media data files, encrypted media data files or a combination of the two. Having partial files and/or encrypted media data files distributed throughout the media network adds additional protection from possible copyright infringing by those who do not have explicit rights for the use of the media data files. Partial and/or encrypted media data files that are transferred to the client device 106 require additional data to reconstruct the media data file and/or unlock the encryption algorithm. In addition to previously described responsibilities, the meta data server 103 can is used to transfer this additional data to the client device 106.

Figure 3A:
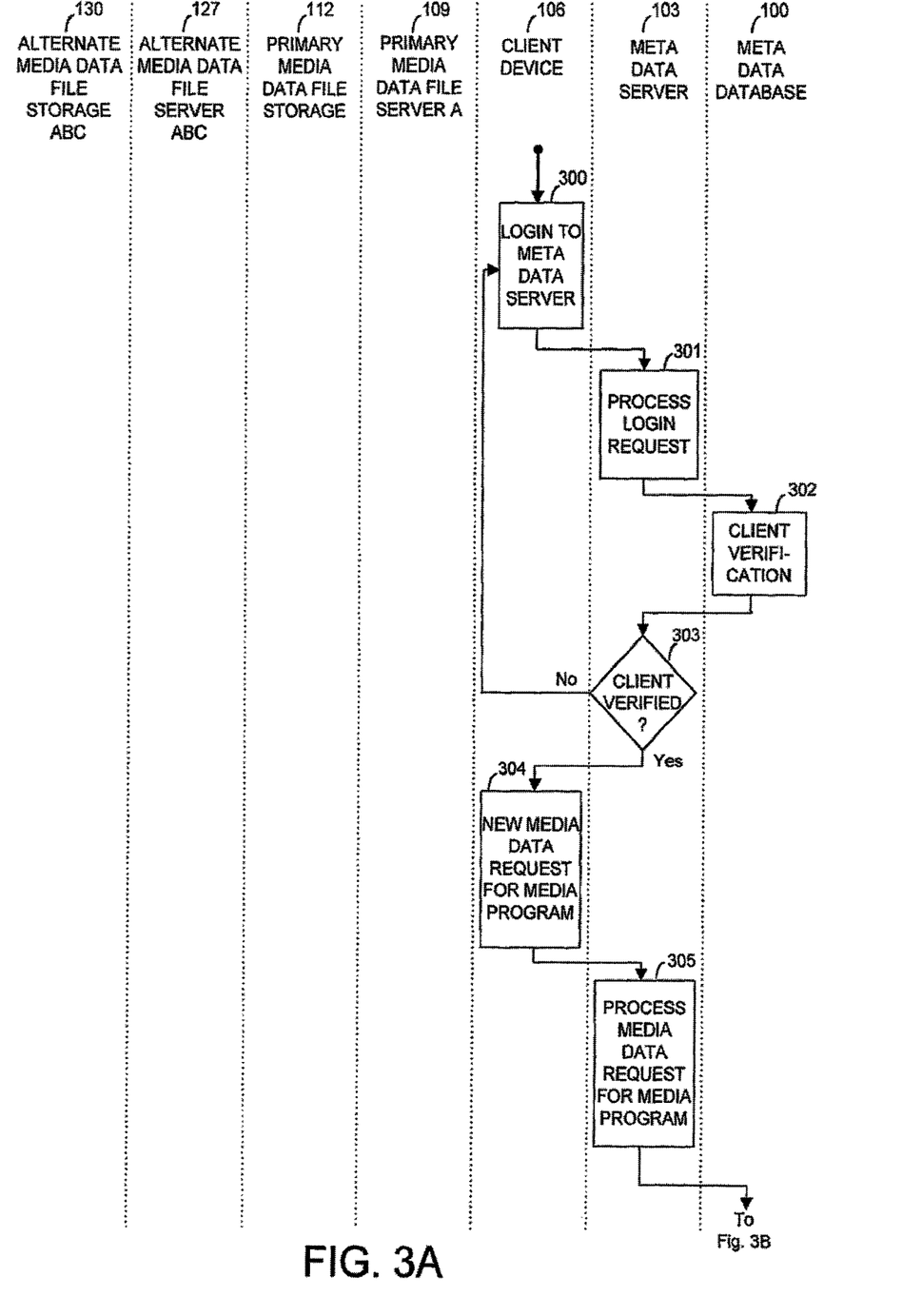
FIGS. 3A to 3G is a system operation and communication flow diagram of an alternative embodiment of the present invention.

Referring to FIG. 3A, access to the secure system for a distributed media network requires a client device 106 to login to a meta data server as shown in block 300. The client device 106 sends a message to login to the meta data server 103, which processes the login request 301. The meta data server communicates with the meta data database 100 to receive client verification 302. If the client is not verified 303, control returns to the client device 106. If the client device 106 has been authorized 203 to login to the meta data server 103, a return message is sent to the client device 106. The client device 106 then requests new media data 304 from the meta data server 103 for the media program schedules by the client device 103. The meta data server 103 then processes the media data request for the media program 305, and messages to the meta data database 100 via the meta data database request 101.

Figure 3B:
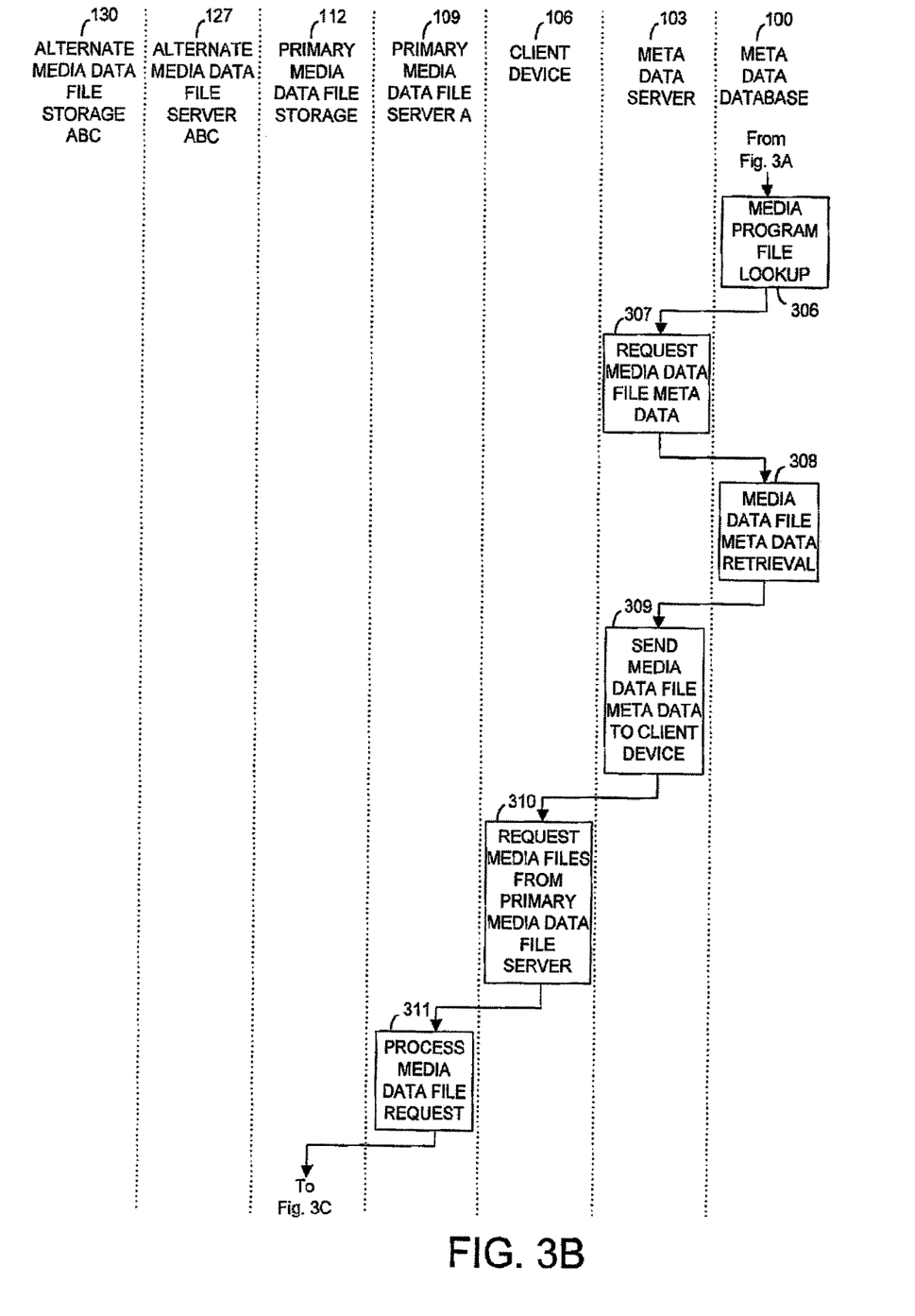

Referring to FIG. 3B, the meta data database 100 stores a list of all media data files and their sequential order which make up the client selected program. The meta data database 100 utilizes stored data of previous requests and transactions made by the particular client device 103 to determine 306 which media data file is next on the program list. The result of the media program file lookup 306 is sent to the meta data server 103, which then requests 307 the meta data database 100 to retrieve all associated meta data for that media data file 308. In block 309, the meta data server 103 messages all of the meta data information the client device 106, which, in turn, messages one of the primary media data file servers 109, as shown in block 310, using the network address of the primary server 109, the directory structure of the primary storage device 112 and the file name of the media data file. As shown in block 311 of FIG. 3B, media data file server A 109 queries the media data file storage A 112 via the media data file request 110 for the media data file.

Figure 3C:
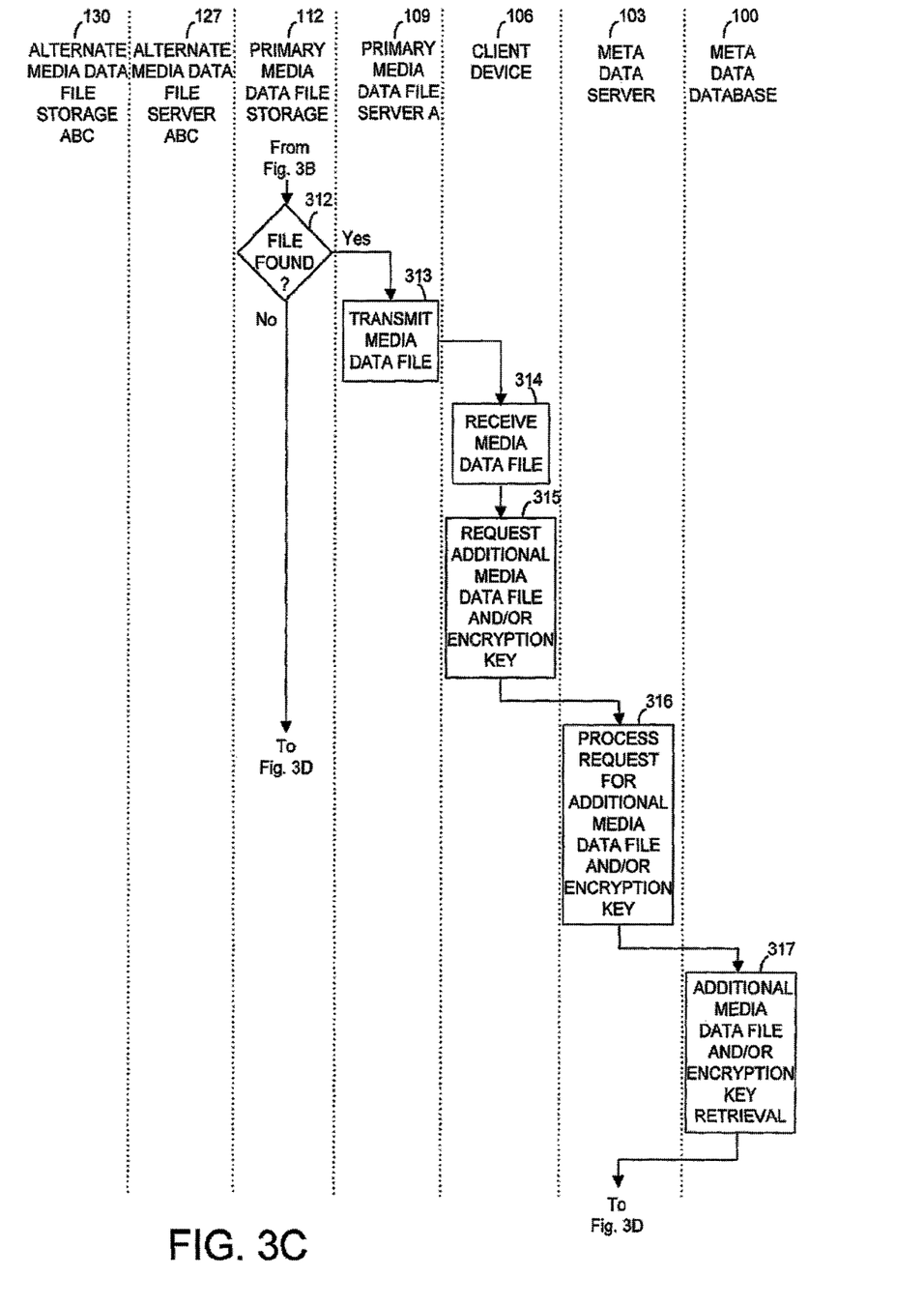

Referring to block 312 of FIG. 3C, if the requested media data file is stored in primary media data storage A files 112, the requested media file is transferred to the primary media data file server A 109, which then transfers 313 the media data file to the client device 106. The client device 106 receives the media data file 314, then requests an additional media data file and/or encryption key 315 from the meta data server 103. The meta data server 103 processes the request for the additional media data file 316, and retrieves the additional data and/or encryption key from the meta data database 100 as shown in block 317. Referring to block 318 of FIG. 3D, the meta data server 103 sends the additional media data file and/or encryption key to the client device 106. The client device 106 processes the media data file 319, and as shown in block 320, returns to block 304 to request new media data for a media program.

Figure 3D:
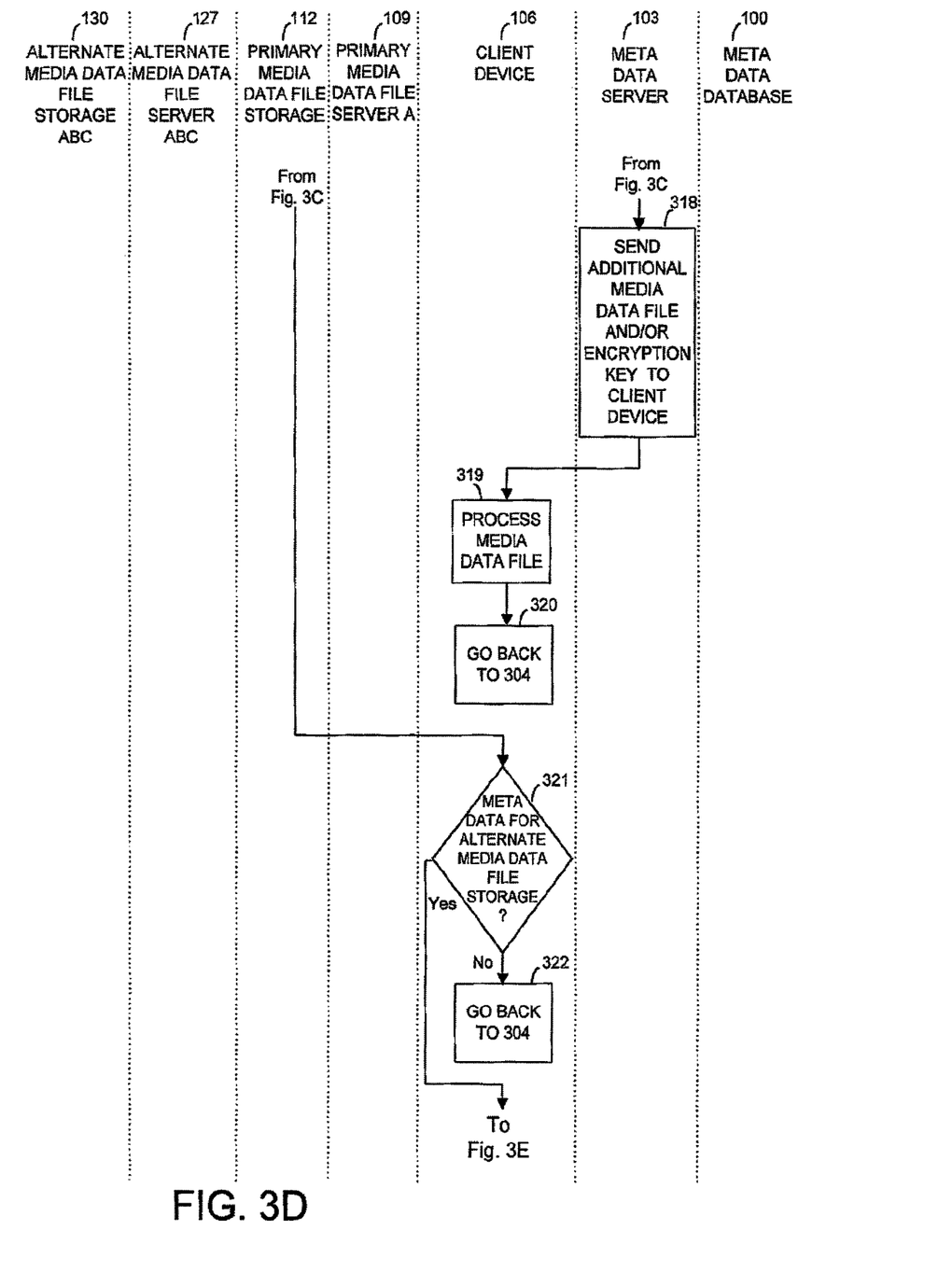

Referring again to block 312 of FIG. 3C, if the requested media data file is not stored in primary media data storage A file 112, then the client server 106 determines whether there is meta data available of alternate media data file storage, as shown in decision block 321 of FIG. 3D. If no meta data is available 321, the client server returns to block 304 to request new media data for a media program, as shown in block 322. If meta data is available 321, the client device 106 requests media files from an alternate media data file server, as shown in block 323 of FIG. 3E, using the network address of the alternate media data file server ABC 127, the directory structure of the alternate media data storage ABC 130, and the file name of the media data file. The alternate media data file server ABC 127 processes the media data file request 324 and queries the alternate media data file storage ABC 130 for the media data file. If the media data file is not located in the alternate media data file storage ABC 130, or if the alternate media data file server ABC 130 is operating defectively for any reason, the media data file will be unable to transfer to the Client Device 106. Upon receiving an error message from the alternate media data file server ABC 127, or upon not being able to establish communication with the alternate media data file server ABC 127, the client device 106 determines whether the media data file is accessible by another alternate media data file server as shown in block 326. The client device 106 continues to try alternate media data file servers, block 328, until it succeeds in retrieving the media data file or until it has tried all media data file servers but has been unsuccessful at locating the media data file. If the client device is unsuccessful, block 327, it messages the meta data server 103 of the error and request the next media data file for the selected program.

Figure 3E:
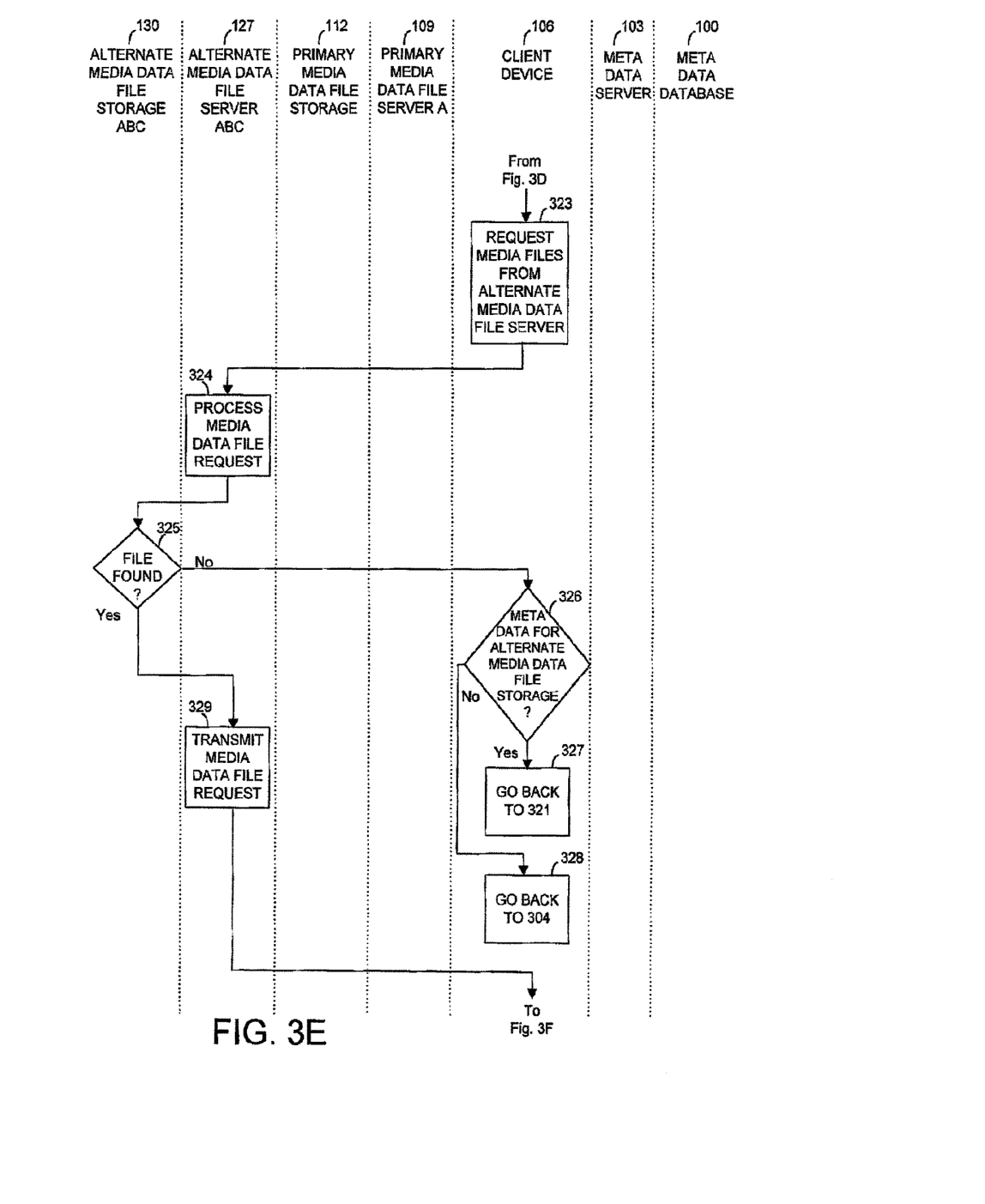
Figure 3F:
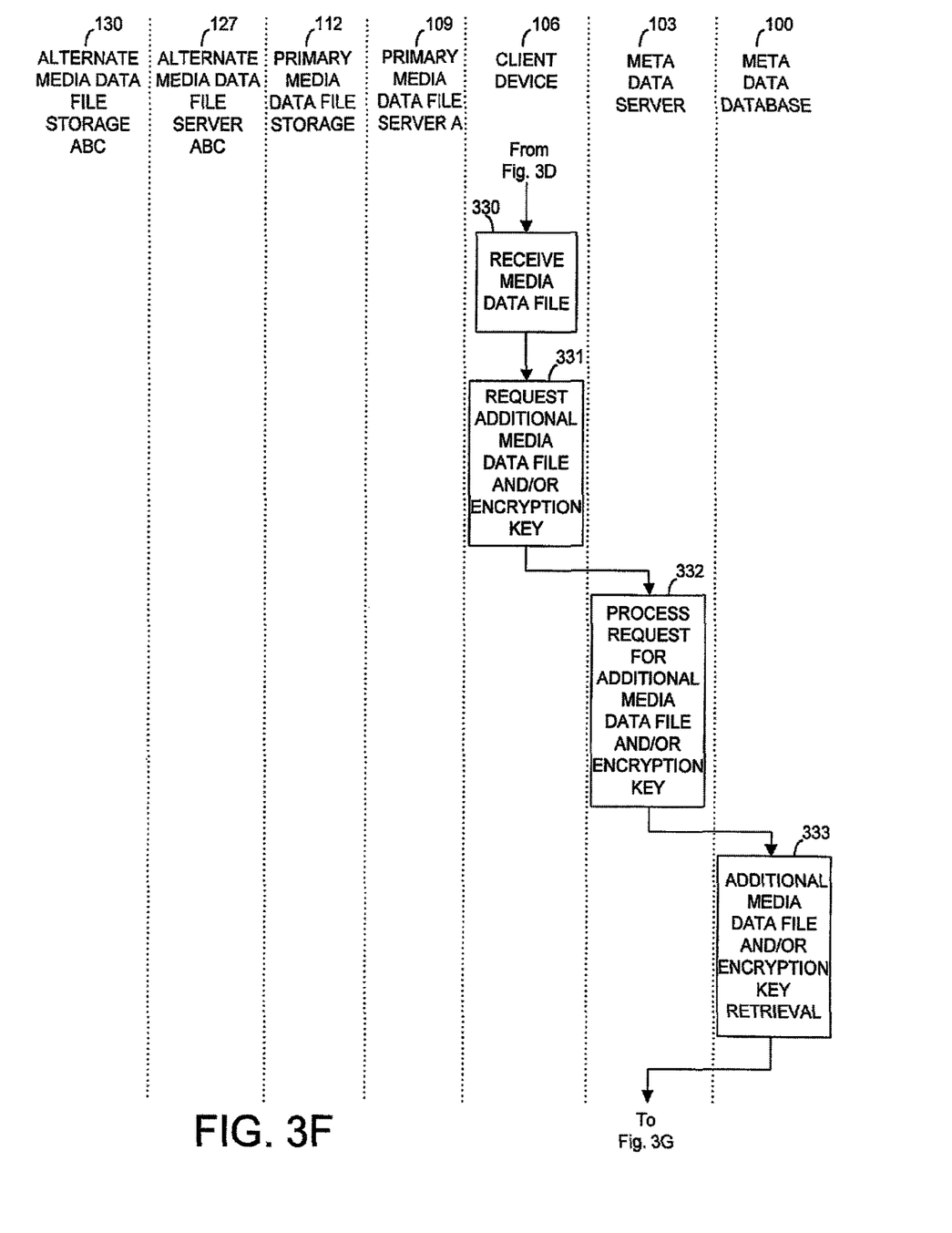
Figure 3G:
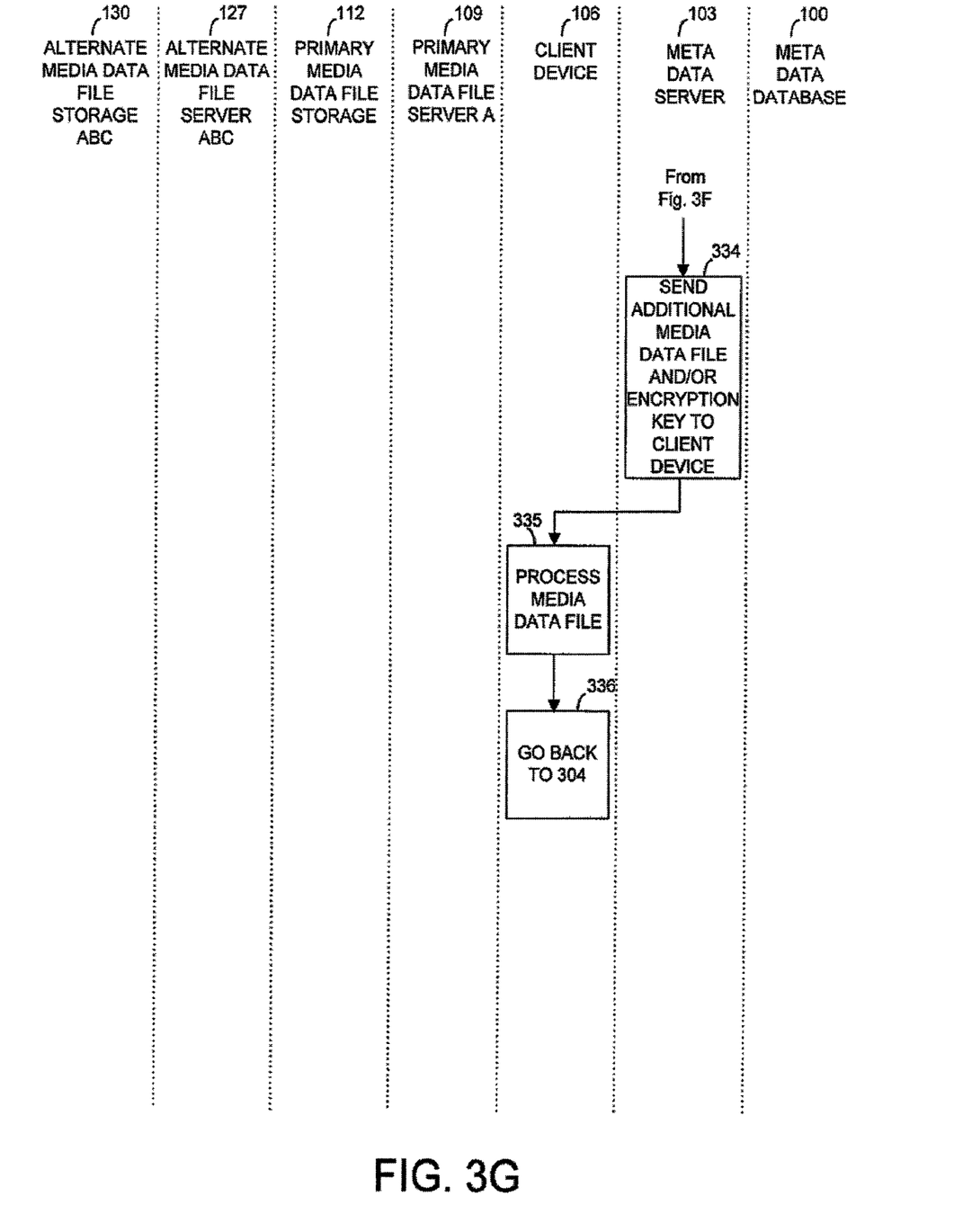

Referring again to block 325, if the media data file is stored in memory in the alternate media data file storage ABC 130, the file is transferred to the alternate media data file server ABC 127, as shown in block 329 of FIG. 3E. The alternate media data file server ABC 127 next transfers the media data file to the client device 106 via the client device alternate sever ABC Feedback 126. The client device 106 receives the media data file 330, as shown in FIG. 3F, and requests an additional media data file and/or encryption key 331 from the meta data server 103. The meta data server 103 processes the request for an additional media data file and/or encryption key 332 the media data file 227, and receives the information from the meta data database 100, as shown in block 333. Referring to FIG. 3G, the meta data server 103 sends the data and/or encryption key to the client device, block 334. The client device 106 processes the media data file 335 and returns to block 304 to request new media data for a media program, as shown in block 336.

Although a preferred embodiment of the invention has been described above by way of example only, it will be understood by those skilled in the field that modifications may be made to the disclosed embodiment without departing from the scope of the invention, which is defined by the appended claims.

The invention claimed is:

1. A distributed media network system comprising:
   at least one meta data server, wherein in response to receiving a request for media data, the meta data server i) provides first meta data associated with a first portion of the requested media data, the first portion of the requested media data being unusable without a second portion of the requested media data, and ii) subsequently provides second meta data associated with said second portion of the requested media data;
   one or more media data servers separate and independently operated from the meta data server, wherein at least one of said first and second meta data provided by the meta data server includes identification of at least one of the one or more media data servers having at least one of said first and second portions of the requested media data; and
   at least one client connected to the meta data server for transmitting a request for media data to the meta data server, the client using said first and second meta data received from the meta data server to locate said at least one of the one or more media data servers and access said first and second portions of the requested media data.

2. The system as in claim 1, wherein a second client of said at least one client functions as a first media data server of said one or more media data servers, and wherein the one or more meta data servers inform said at least one client that said second client has said requested media data.

3. The system of claim 1, wherein the media data are encrypted, and the at least one meta data server is further adapted to transmit a decryption key to the client for using the media data.

4. A distributed media system comprising:
   a media service system managed by a media service provider, wherein in response to receiving a request for media content the media service system i) provides first meta data associated with a first portion of the requested media content, the first portion of the requested media content being unusable without a second portion of the requested media content, and ii) subsequently provides second meta content associated with said second portion of the requested media content;
   a plurality of electronic devices, wherein at least one of said first and second meta data includes identification of at least one of said plurality of electronic devices having at least one of said first and second portions of the requested media content; and
   a client device for transmitting a request for media content to the media service system, the client device using said first and second meta data received from the media service system to locate said at least one of the electronic devices and access said first and second portions of the requested media content therefrom.

5. The distributed media system claim 4, wherein the media content is encrypted, and the media service system transmits a decryption key to the client device for using the media content, in response to a subsequent request for the decryption key from the client.

6. The distributed media system of claim 4, wherein the electronic devices are computer systems.

7. The distributed media system of claim 4, wherein the requested media content is accessed from an electronic device over the Internet.

8. The distributed media system of claim 4, wherein the requested media content is an audio file.

* * * * *